(12) United States Patent
Deva et al.

(10) Patent No.: US 7,814,255 B1
(45) Date of Patent: Oct. 12, 2010

(54) MULTI-INTERFACE MULTI-CHANNEL MODULAR HOT PLUG I/O EXPANSION

(75) Inventors: Shailendra Deva, Sunnyvale, CA (US); Richard A. Raffel, Menlo Park, CA (US); Wenjun Chen, Menlo Park, CA (US); Martin S. Mok, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 14 days.

(21) Appl. No.: 12/423,212

(22) Filed: Apr. 14, 2009

(51) Int. Cl.
*G06F 13/00* (2006.01)
(52) U.S. Cl. .......................... 710/302; 710/10
(58) Field of Classification Search ......... 710/300–315, 710/62–64, 72–74
See application file for complete search history.

(56) References Cited

U.S. PATENT DOCUMENTS

| | | | |
|---|---|---|---|
| 4,724,520 A * | 2/1988 | Athanas et al. | 709/252 |
| 5,497,373 A * | 3/1996 | Hulen et al. | 370/259 |
| 5,666,557 A * | 9/1997 | Cassidy et al. | 710/8 |
| 6,044,423 A * | 3/2000 | Seo et al. | 710/302 |
| 6,073,201 A * | 6/2000 | Jolley et al. | 710/315 |
| 6,484,216 B1 * | 11/2002 | Zegelin | 710/11 |
| 6,594,721 B1 * | 7/2003 | Sakarda et al. | 710/304 |
| 7,032,052 B2 * | 4/2006 | Sauber et al. | 710/301 |
| 7,062,584 B1 * | 6/2006 | Worrell et al. | 710/301 |
| 7,171,502 B2 * | 1/2007 | Jeon et al. | 710/300 |
| 7,277,966 B2 * | 10/2007 | Hanson et al. | 710/16 |
| 7,454,530 B2 * | 11/2008 | Cahill et al. | 710/8 |
| 2005/0015525 A1 * | 1/2005 | Cahill et al. | 710/62 |

* cited by examiner

*Primary Examiner*—Raymond N Phan
(74) *Attorney, Agent, or Firm*—Osha • Liang LLP

(57) ABSTRACT

A device includes a connector having first and second signal pins adapted to, when the connector is being connected to a mating connector of another device, make a first connection using the first signal pin prior to making a second connection using the second signal pin, a first circuit operatively coupled to the first signal pin and configured to identify at least three pre-determined signal patterns receivable from the another device using the first connection, wherein each of the at least three pre-determined signal patterns corresponds to one of at least three pre-determined interface protocols, and a second circuit operatively coupled to the first circuit and the second signal pin, wherein the second circuit is configured, responsive to the first circuit identifying a pre-determined signal pattern of the at least three pre-determined signal patterns, to interface with the another device using at least the second signal pin, wherein to interface with the another device is according to a pre-determined interface protocol corresponding to the pre-determined signal pattern, wherein configuring the second circuit responsive to the first circuit identifying the pre-determined signal pattern is prior to the second signal pin making the second connection.

21 Claims, 5 Drawing Sheets

MULTI-INTERFACE MULTI-CHANNEL MODULAR HOT PLUG I/O EXPANSION

BACKGROUND

Blade servers are self-contained all inclusive computer servers, designed for modularity and high density. A blade enclosure, which can hold multiple blade servers, provides services such as power, cooling, networking, various IO (input/output) interconnects and management. The blade enclosure typically provides one or more interface facilities (e.g., buses) on a backplane to which the server blades (i.e., blade servers) will be plugged in connect, for example to peripheral (e.g., networking or storage) IO blades, and vice versa. Backplane may also be referred to as mid-plane or front-plane depending on physical configuration of the system enclosure.

The interface facilities allow the server blades and peripheral IO blades to interface with each other using supported interface protocols. Interface protocols are pre-determined signaling arrangements for communication (e.g., control handshake or data transfer) among two or more objects such as circuits, modules, or systems. A server blade or a peripheral IO blade may be designed to support Hot-plugging, which is the function allowing the blades to be added or replaced in the blade enclosure while the entire system is operating. Various interface protocols used for providing IO expansion to blade servers are described below. Some interface protocols provide support for Hot-plugging.

Peripheral Component Interconnect Express (PCIe) is structured around point-to-point full duplex serial links called lanes. In PCIe 1.1, for example, each lane is capable of transmitting at data rate of 250 MB/s (million bytes per second) in each direction. The interface protocol associated with the PCIe is referred to as PCIe protocol.

Management Data Input/Output (MDIO) is a bus structure standard to connect Media Access Control (MAC) devices with physical medium interface devices (PHY) specified by IEEE 802.3 for all speeds of the Ethernet protocol. MDIO provides a standardized access method to internal registers of PHY devices allowing a user to change configuration information during operation, as well as read the status of PHY devices. The MDIO interface is implemented by two pins, a Data (MDIO) pin and a Management Data Clock (MDC) pin. The interface protocol associated with the MDIO is referred to as MDIO protocol.

XAUI (a concatenation of the Roman numeral X, meaning ten, and the initials of "Attachment Unit Interface") is a standard to connect MAC devices with PHY devices specified by IEEE 802.3ae 10 GbE specification for 10 Gigabit Ethernet (10 GbE). XAUI is a 16-pin interface consisting of four differential lanes in both the transmit and receive directions. Data is 8b/10b encoded resulting in a data-rate of 3.125 GHz per lane. Data is driven and received by SerDes (Serializer/Deserializer) which are capable of clock and data recovery (CDR). The interface protocol associated with the XAUI is referred to as XAUI protocol.

Inter-Integrated Circuit (I$^2$C or I2C) is a multi-master serial computer bus used to attach low-speed peripherals to a motherboard, embedded system, or cellphone. I2C uses only two bidirectional open-drain lines, Serial Data (SDA) pin and Serial Clock (SDC) pin, pulled up with resistors. Typical voltages used are +5 V or +3.3 V although systems with other, higher or lower, voltages are permitted. SMBus is a subset of I2C that defines stricter electrical and protocol conventions. The interface protocol associated with the I2C is referred to as I2C protocol.

Machines that support Hot-plugging need to be able to modify their operation for the changed configuration, either automatically on detecting the change, or by user intervention. Generally speaking, all electrical and mechanical connections associated with Hot-plugging are designed so that neither the equipment nor the user can be harmed during the Hot-plugging process. Hot-plug methods may use a specialized connector with staggered pins, so that certain pins are certain to be connected before others. Printed circuit boards may be made with staggered edge-fingers for direct Hot-plugging into a backplane connector. Staggered-pin designs may have power and ground pins longer than the others, ensuring that no sensitive circuitry is connected before there is a reliable system power and ground. The other pins may all be the same length or, in some cases, three different pin lengths may be used.

SUMMARY

In general, in one aspect, the invention relates to a device including a connector having first and second signal pins adapted to, when the connector is being connected to a mating connector of another device, make a first connection using the first signal pin prior to making a second connection using the second signal pin, a first circuit operatively coupled to the first signal pin and configured to identify at least three pre-determined signal patterns receivable from the another device using the first connection, wherein each of the at least three pre-determined signal patterns corresponds to one of at least three pre-determined interface protocols, and a second circuit operatively coupled to the first circuit and the second signal pin, wherein the second circuit is configured, responsive to the first circuit identifying a pre-determined signal pattern of the at least three pre-determined signal patterns, to interface with the another device using at least the second signal pin, wherein to interface with the another device is according to a pre-determined interface protocol corresponding to the pre-determined signal pattern, wherein configuring the second circuit responsive to the first circuit identifying the pre-determined signal pattern is prior to the second signal pin making the second connection.

In general, in one aspect, the invention relates to a system including a first device having a first connector, and a second device including a second connector having first and second signal pins adapted to, when the second connector is being connected to the first connector of the first device, make a first connection using the first signal pin prior to making a second connection using the second signal pin, a first circuit operatively coupled to the first signal pin and configured to identify at least three pre-determined signal patterns receivable from the first device using the first connection, wherein each of the at least three pre-determined signal patterns corresponds to one of at least three pre-determined interface protocols, and a second circuit operatively coupled to the first circuit and the second signal pin, wherein the second circuit is configured, responsive to the first circuit identifying a pre-determined signal pattern of the at least three pre-determined signal patterns, to interface with the first device using at least the second signal pin, wherein to interface with the second device is according to a pre-determined interface protocol corresponding to the pre-determined signal pattern, wherein configuring the second circuit responsive to the first circuit identifying the pre-determined signal pattern is prior to the second signal pin making the second connection.

In general, in one aspect, the invention relates to a method for connecting a first device and a second device. The method includes connecting a second connector of the second device to a first connector of the first device, wherein the second connector comprises first and second signal pins adapted to, when the second connector is being connected to the first connector, make a first connection using the first signal pin prior to making a second connection using the second signal pin, receiving, by a first circuit of the second device using the first connection, a pre-determined signal pattern of at least three pre-determined signal patterns receivable from the first device, wherein each of the at least three pre-determined signal patterns corresponds to one of at least three pre-determined interface protocols, identifying, by the first circuit, the pre-determined signal pattern of the at least three pre-determined signal patterns, and configuring a second circuit of the second device, responsive to the first circuit identifying the pre-determined signal pattern, to interface with the first device using at least the second signal pin, wherein to interface with the second device is according to a pre-determined interface protocol corresponding to the pre-determined signal pattern, wherein the configuring the second circuit responsive to the first circuit identifying the pre-determined signal pattern is prior to the second signal pin making the second connection.

Other aspects of the invention will be apparent from the following description and the appended claims.

DETAILED DESCRIPTION

Figure 1:
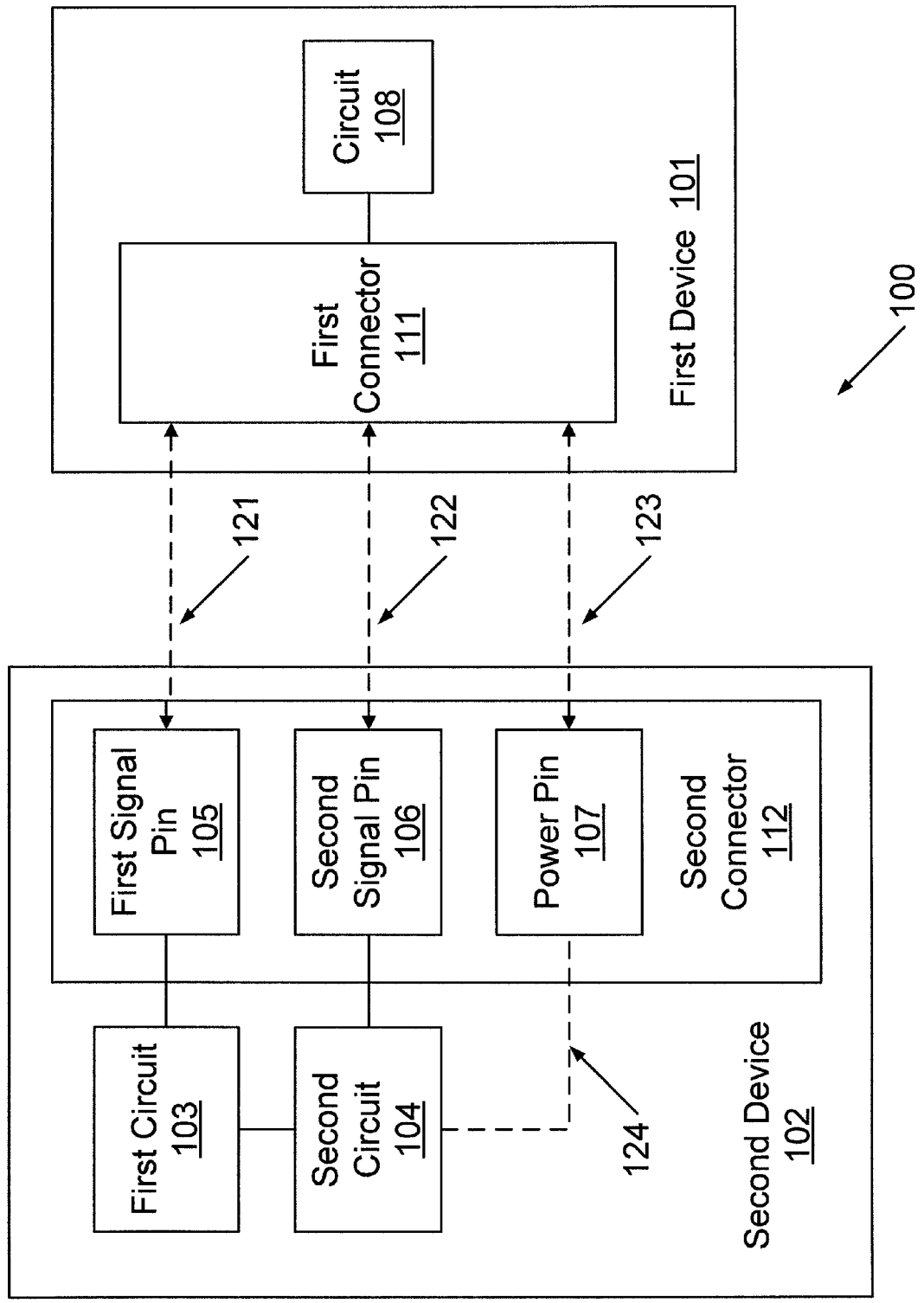
FIG. 1 depicts a schematic block diagram of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to connect and selectively configure, in a Hot-plugging process, two or more devices to allow communications there between, wherein the communications are according to one of at least three pre-determined interface protocols.

FIG. 1 depicts a schematic block diagram of a system (100) in accordance with one or more embodiments of the invention. In one or more embodiments of the invention, one or more of the modules shown in FIG. 1 may be omitted, repeated, and/or substituted. Accordingly, embodiments of the invention should not be considered limited to the specific arrangements of modules shown in FIG. 1.

As shown in FIG. 1, the system (100) includes a first device (101) connectably coupled with a second device (102) via first, second, and third connections (121), (122), and (123), respectively. Generally speaking, the first, second, and third connections (121), (122), and (123) may be established or un-established (i.e., made or broken) using signal pins of the first and second connectors (111) and (112) in a process of plugging together or unplugging apart the first and second connectors (111) and (112). As shown in FIG. 1, the first, second, and third connections (121), (122), and (123) may be made using first and second signal pins (105), (106), and a power pin (107) of the second connector (112), respectively. The corresponding signal and power pins of the first connector (111) are omitted in FIG. 1 for clarity.

Throughout this document, the term "pin" is used to refer to any type of connection element of a connector such as conductive pin, socket, pad, conductor, edge finger, or any other suitable connection element of a connector. In addition, the second device (102) includes first and second circuits (103) and (104) operatively coupled to the first and second signal pins (105), respectively. The second circuit (104) is shown to be connected to the power pin (107) for receiving supplied power from the first device (101) when the connection is made between the first and second connectors (111) and (112). Furthermore, the first device (101) includes circuit (108) operatively coupled to the first connector (111). Although specific number of modules are shown in FIG. 1, those skilled in the art will recognize that any number of devices, circuits, connectors, signal pins, and/or connections may be included in the system (100). For example, a selected pre-determined interface protocol for communication among devices of the system (100) may require more than two signal pins in each connector of the devices.

In one or more embodiments of the invention, the first circuit (103), the second circuit (104), and the circuit (108) cooperatively perform operations for communication (e.g., control handshake or data transfer) between the first and second devices (101) and (102) according to the selected pre-determined interface protocol.

In one or more embodiments of the invention, the first and second signal pins (105) and (106) are adapted to, when the second connector (112) is being connected to the first connector (101), make the first connection (121) using the first signal pin (105) prior to making a second connection (122) using the second signal pin (106). For example, the first and second signal pins (105) and (106) may be in a staggered configuration to ensure the first connection (121) to be made prior to the second connection (122) in the process of plugging together the first and second connectors (111) and (112). Although the speed of plugging cannot be controlled precisely, practical considerations may provide limits that can be used to determine worst-case conditions. For a typical staggered pin design where the length difference is 0.5 mm (0.020 inches), the elapsed time between long and short pin contact may be between 25 ms and 250 ms. Those skilled in the art, with the benefit of this disclosure, will recognize that other techniques, known or to be developed, may also be used to ensure the first connection (121) to be made prior to the second connection (122) in the process of plugging together the first and second connectors (111) and (112) without deviating from the spirit of this invention.

In one or more embodiments of the invention, the first circuit (103) may be configured to identify at least three pre-determined signal patterns receivable from the first device using the first connection (121). For example, the circuit (108) may generate a clock signal pattern, a static logic one signal pattern, or a static logic zero signal pattern. These signal patterns may be transmitted to the first signal pin (105) when the first connection (121) is made during the process of plugging together the first and second connectors (111) and (112). Those skilled in the are will recognize that any of these signal patterns may be identified using various known circuitries. Each of these pre-determined signal patterns may correspond to one of at least three pre-determined interface protocols. For example, the pre-determined signal patterns may include PCIe protocol, MDIO protocol, XAUI protocol, and/or Inter-Integrated Circuit (I2C) protocol described above.

As shown in FIG. 1, the second circuit (104) is operatively coupled to the first circuit (103) and the second signal pin (106). In one or more embodiments of the invention, a pre-determined interface protocol may be selected corresponding to an identified pre-determined signal pattern of the at least three pre-determined signal patterns. Accordingly, the second circuit may be configured, responsive to the first circuit (103) identifying the pre-determined signal pattern, to interface with the first device (101) using at least the second signal pin (106). Specifically, the second circuit (104) may be configured to send/receive a signal to/from the second signal pin (106) according to the selected pre-determined interface protocol. For example, the signal may be sent/received by the second circuit (104) according to the PCIe protocol if the clock signal pattern is identified by the first circuit (103) as being present on the first signal pin (105) during the process of plugging together the first and second connectors (111) and (112).

Additional examples are described in detail with respect to FIGS. 3A-3C below. Those skilled in the art will recognize that the second circuit (104) may be implemented using configurable or reconfigurable technologies known or yet to be developed in the future without deviating from the spirit of the invention. For example, the second circuit (104) may be implemented using programmable logic array (PLA), programmable array logic (PAL), complex programmable logic device (CPLD), field programmable gate array (FPGA), etc.

In one or more embodiments of the invention, the configuration of the second circuit (104) may be completed within the time period (e.g., between 25 ms and 250 ms described above) prior to the second signal pin (106) making the second connection (122) during the process of plugging together the first and second connectors (111) and (112). As a result, the second circuit (104) may be ready to send/receive the signal to/from the second signal pin (106) according to the selected pre-determined interface protocol prior to the second signal pin (106) making the second connection (122). For example, if the clock signal pattern (e.g., PCIe Hot-Plug Clock signal) is identified by the first circuit (103) as being present on the first signal pin (105) during the process of plugging together the first and second connectors (111) and (112), the PCIe protocol may be selected such that the second circuit (104) may be configure accordingly and ready to send/receive PCIe Hot-Plug Status/Data signal on the second signal pin (106) prior to the second connection being (122) made. Additional examples are described in detail with respect to FIGS. 3A-3C below.

As shown in FIG. 1, the second circuit (104) is optionally connected to the power pin (107) via an optional connection (124). In one or more embodiments of the invention, the second circuit (104) may receive supplied power from the first device (101) via the power pin (107) of the second connector (112) in a Hot-plugging process. During the process of plugging together the first and second connectors (111) and (112), the power connection (123) may be made prior to the second signal pin (122) making the second connection (122) such that the second circuit (104) may receive stable power and ready to send/receive the signal, according to the selected pre-determined interface protocol, on the second signal pin (106) prior to the second connection being (122) made. For example, the power pin (107) and the second signal pin (106) may be in a staggered configuration to ensure the third connection (123) to be made prior to the second connection (122) in the process of plugging together the first and second connectors (111) and (112). Those skilled in the art, with the benefit of this disclosure, will recognize that other techniques, known or to be developed, may also be used to ensure the third connection (123) to be made prior to the second connection (122) in the process of plugging together the first and second connectors (111) and (112) without deviating from the spirit of this invention.

In one or more embodiments of the invention, the first circuit (103) may receive supplied power in the same manner as the second circuit (104) described above. The power connection for the first circuit (103) is not shown for clarity. In one or more embodiments of the invention, the power pin (107), the first signal pin (105), and the second signal pin (106) may be in a staggered configuration with three different pin lengths in the second connector (112) such that the first circuit receives stable power prior to the first connection (121) being made and that the second circuit receives stable power prior to the second connection (122) being made.

In one or more embodiments of the invention, the first circuit (103) and/or the second circuit (104) may receive supplied power from sources other than the first device (101), such as an onboard battery. For example, the optional connection (124) may not be in place for connecting the second circuit (104) to the power pin (107).

Figure 2:
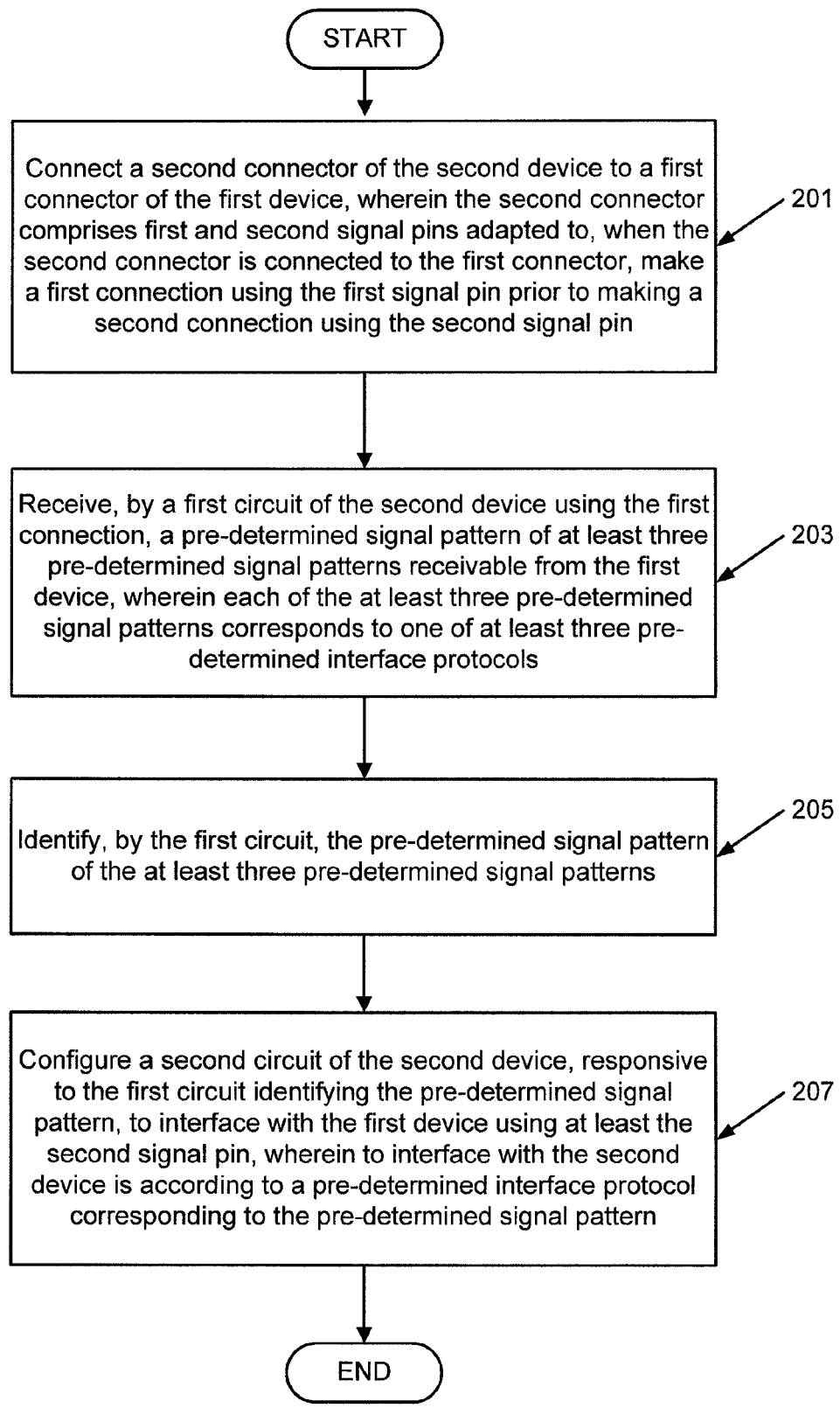
FIG. 2 depicts a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

The method as shown in FIG. 2 may be practiced using system (100) described with respect to FIG. 1 above. Initially, a second connector of a second device is connected to a first connector of the first device, for example by plugging together the first and second connectors. In one or more embodiments of the invention, first and second signal pins of the second connector may be adapted to, when the second connector is being connected to the first connector, make a first connection using the first signal pin prior to making a second connection using the second signal pin (Step 201). For example, the first and second signal pins may be arranged in a staggered configuration in the second connector to ensure the first connection to be made prior to the second connection.

In Step 203, a first circuit of the second device may receive, using the first connection after it is made, a pre-determined signal pattern of at least three pre-determined signal patterns receivable from the first device. For example, the first device may generate a clock signal pattern, a static logic one signal pattern, or a static logic zero signal pattern receivable by the second device. These signal patterns may be transmitted to the first signal pin when the first connection is made during the process of plugging together the first and second connectors. Those skilled in the are will recognize that any of these signal patterns may be identified using various known circuitries. Each of these pre-determined signal patterns may correspond to one of at least three pre-determined interface protocols. For example, the at least three pre-determined signal patterns may include PCIe protocol, MDIO protocol, XAUI protocol, and/or Inter-Integrated Circuit (I2C) protocol described above.

In Step 205, the first circuit of the second device may identify the pre-determined signal pattern of the at least three pre-determined signal patterns. Responsive to the first circuit identifying the pre-determined signal pattern, a second circuit of the second device may be configured to interface, according to a pre-determined interface protocol, with the first device using at least the second signal pin. In one or more embodiments of the invention, the pre-determined interface protocol is selected corresponding to the pre-determined signal pattern identified by the first circuit above. Those skilled in the art will recognize that configuring the second circuit may be based on configurable or reconfigurable technologies without deviating from the spirit of the invention.

In one or more embodiments of the invention, the configuration of the second circuit may be completed within the time period (e.g., between 25 ms and 250 ms described above) prior to the second signal pin making the second connection during the process of plugging together the first and second connectors. As a result, the second circuit may be ready to send/receive the signal to/from the second signal pin according to the selected pre-determined interface protocol prior to the second signal pin making the second connection. For example, if the clock signal pattern (e.g., PCIe Hot-Plug Clock signal) is identified by the first circuit as being present on the first signal pin during the process of plugging together the first and second connectors, the PCIe protocol may be selected such that the second circuit may be configure accordingly and ready to send/receive PCIe Hot-Plug Status/Data signal on the second signal pin prior to the second connection being made. Additional examples are described in detail with respect to FIGS. 3A-3C below.

In one or more embodiments of the invention, the second circuit may receive supplied power from the first device via a power pin of the second connector. During the process of plugging together the first and second connectors, the power connection may be made prior to the second signal pin making the second connection such that the second circuit may receive stable power and ready to send/receive the signal, according to the selected pre-determined interface protocol, on the second signal pin prior to the second connection being made.

In one or more embodiments of the invention, the first circuit may receive supplied power in the same manner as the second circuit described above.

In one or more embodiments of the invention, the first circuit and/or the second circuit may receive supplied power from sources other than the first device, for example an onboard battery.

The following is an example in a Hot-plugging process to connect and selectively configure two devices to allow communications according to one of at least three pre-determined interface protocols. Those skilled in the art will appreciate that this example application may be implemented using the system (100) of FIG. 1 and based on the method described with respect to FIG. 2 above.

Figure 3A:
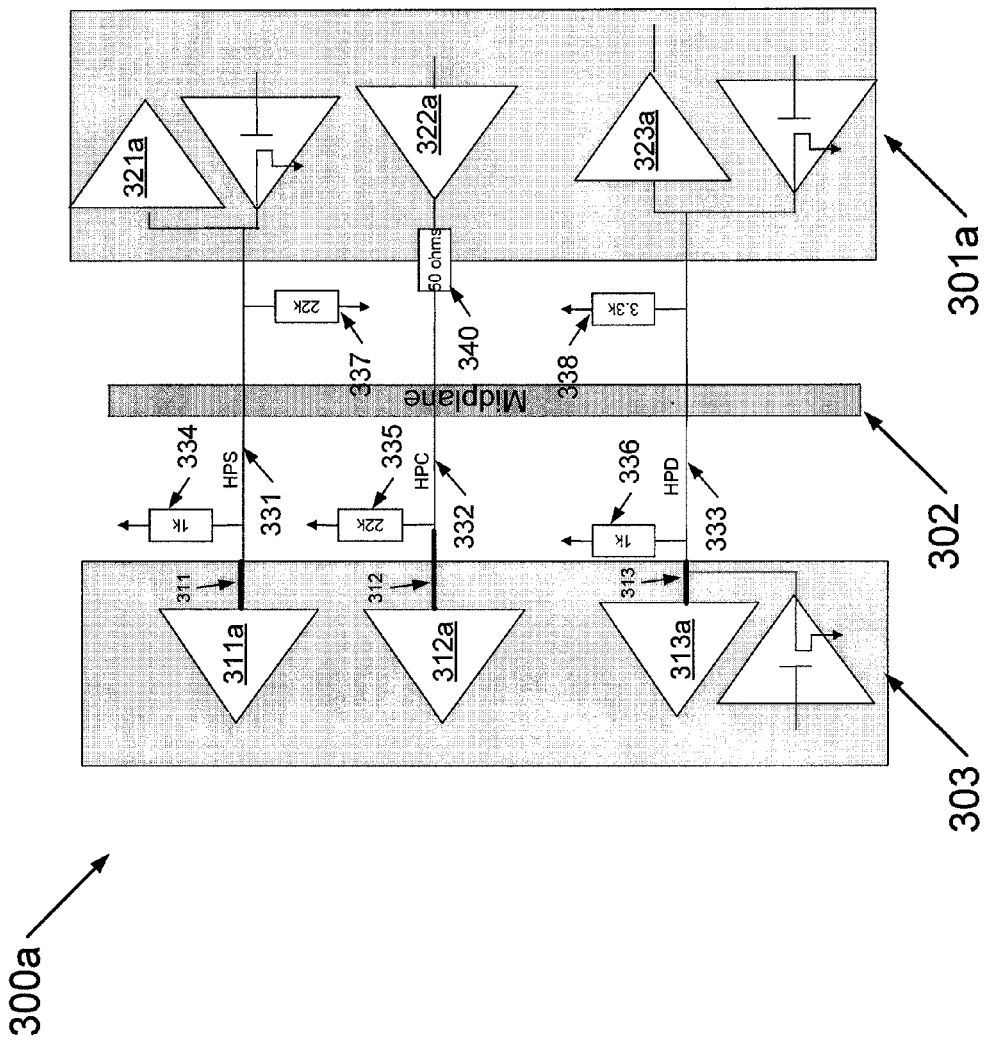
FIGS. 3A-3C depict example systems in accordance with one or more embodiments of the invention.
Figure 3B:
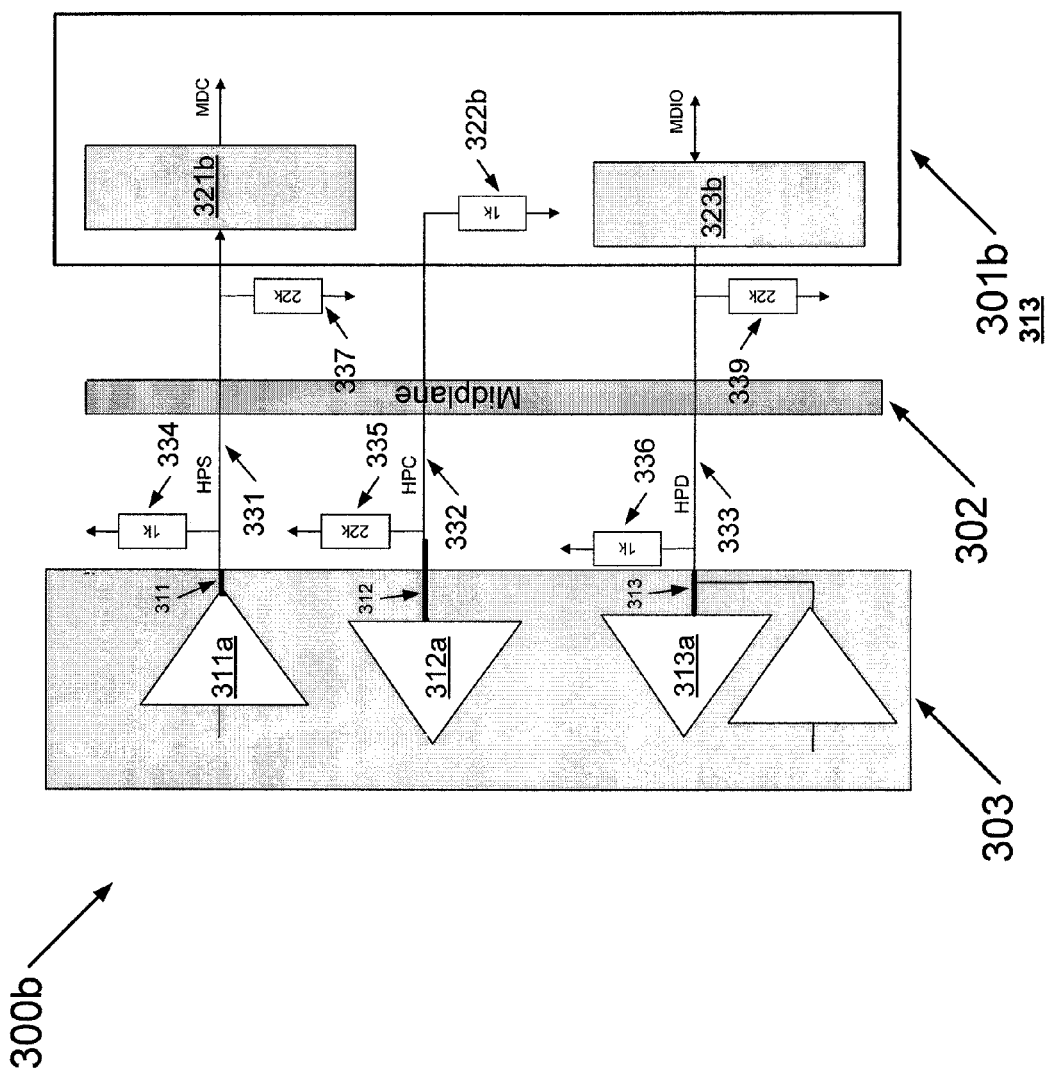
Figure 3C:
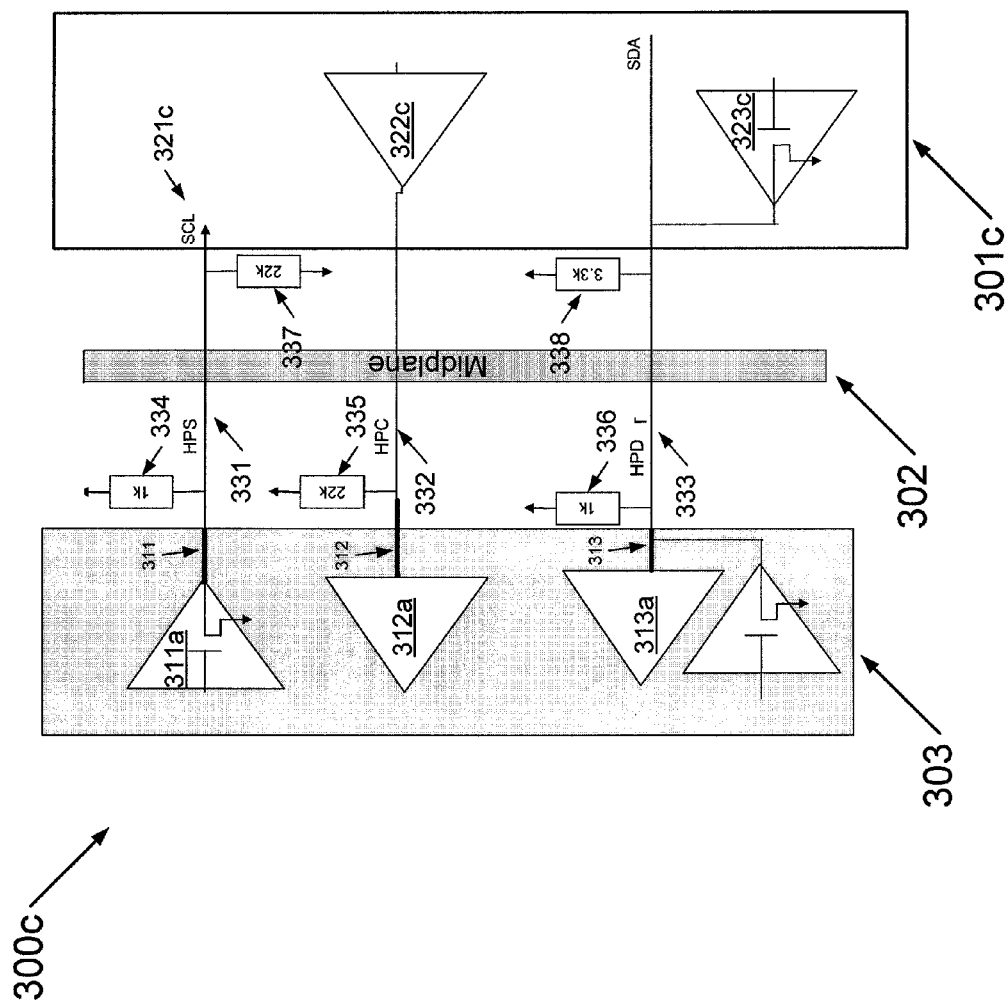

As shown in FIGS. 3A-3C, each of the systems 300a-300c includes a mid-plane (302) providing three connections HPS (331), HPC (332), and HPD (333) between a server blade (303) and one of three types of peripheral IO blades (301a), (301b), and (301c). The connections HPS (331), HPC (332), and HPD (333) allow circuits (311a)-(313a) coupled with signal pins (311)-(313) of the server blade (303) to communicate with circuits (321a)-(323a), (321b)-(323b), or (321c)-(323c) of the peripheral IO blades (301a), (301b), or (301c), respectively. The signal pins coupled to the circuits (311)-(313), (321a)-(323a), (321b)-(323b), and (321c)-(323c) in the peripheral IO blades (301a), (301b), and (301c) are omitted for clarity. The connections HPS (331), HPC (332), and HPD (333) can be established or un-established (i.e., made or broken) by inserting or removing the server blade (303) and/or one of the peripheral IO blades (301a), (301b), and (301c) into or from the mid-plane (302) in a hot-plug process while the server blade (303) and/or one of the peripheral IO blades (301a), (301b), and (301c) are powered and operational.

The connections HPS (331), HPC (332), and HPD (333) form a three wire interface, which is designed to be a 3.3V based interface. All the pull-ups on these three connections must be connected to 3.3V power rail on both the server blade as well as the peripheral IO blade. The selection of which type of interface protocol (e.g., PCIe, MDIO, I2C, XAUI, etc.) the server blade (303) adopts in the system (300a)-(300c) is determined by the peripheral IO blade inserted into the mid-plane (302). Said in other words, the personality of the inserted peripheral IO blade determines the personality of this three wire interface.

In the examples shown in FIGS. 3A-3C, signal patterns present on the connection HPC (332) is used to determine the personality of the remaining two connections HPD (333) and HPS (331) based on making the connection HPC (332) prior to making the connections HPS (331) and HPD (333) during the hot-plug process, for example by the staggered configuration of the signal pins (311)-(313). In some examples, the interface protocol may require more than three connections and personality of additional connections may be determined in the same manner. In other examples, more than one set of three wire interface may be used for interfacing between the server blade (303) and the inserted peripheral IO blade. Table 1 below lists example signal patterns possibly present on the HPC (332) and the corresponding behaviors of connections HPS (331) and HPD (333) according to the interface protocols corresponding to the signal patterns.

TABLE 1

| Connection Behavior | HPC signal pattern |
| --- | --- |
| HPC - Clock<br>HPD - HP Status/Data Exchange<br>HPS - HP Data direction switch | Clock signal pattern driven by peripheral IO blade (301a) |
| HPC - Low selected by peripheral IO blade<br>HPD - MDIO (MDIO data)<br>HPS - MDC (MDIO clock) | Tied Low by peripheral IO blade (30 1b) |
| HPC - Float or pulled High on peripheral IO blade<br>HPD - SDA (I2C data)<br>HPS - SDC (I2C clock) | Pulled up high by peripheral IO blade (301c) |

The HPC (332) connection has a 22K ohm pull-up (335) to 3.3V on the server blade (303), thereby allowing the peripheral IO blade (301a)-(301c) to drive either a clock or one of the two static states according to Table 1 above. This implies that the server blade (303) defaults to I2C mode, unless otherwise modified by the peripheral IO blade (301a)-(301c).

The HPD (333) connection has a 1K ohm pull-up (336) to 3.3V on the server blade (303), hence when the interface protocol is either MDIO or I2C, the pull-up required by this bi-directional pin is supplied by the server blade (303). This could result in potential real estate savings on the peripheral IO blades (301a)-(301c).

The HPS (331) connection may be driven by both the server blade (303) and the inserted peripheral IO blade to carry HP Data direction switch signal for PCIe protocol or clock signal for MDC or I2C protocol. The HPS (331) connection has a 1K ohm pull-up (334) to 3.3V on each blade. There is no requirement to provide any termination on the peripheral IO blade side for this signal.

In addition, appropriate pull-down (337), (338), or serial termination (340) are used with the connections HPS (331), HPC (332), and HPD (333) in the peripheral IO blades (301a)-(301c).

Based on the signal patterns listed in Table 1 above as identified by circuit (312a) coupled to the signal pin (312) of the server blade (303), for each inserted peripheral IO blade (301a)-(301c), the three wire interface of the connections HPS (331), HPC (332), and HPD (333) is personalized according to different interface protocols to support the following functions:

(i) Peripheral IO blade hot-plug function for peripheral IO blade (301a) implemented with PCIe interface (FIG. 3A).

(ii) MDIO/MDC function for Ethernet based peripheral IO blade (301b) where the MAC is resident on the server blade (303) and the PHYs are resident on the peripheral IO blade (301b) (FIG. 3B).

(iii) I2C function for peripheral IO blade (301c) where the MAC/HCA or other intelligent device is resident on the server blade (303) and the PHY for such interfaces are resident on the peripheral IO blade (301c) (FIG. 3C). The I2C interface is expected to run at low frequencies, for example less than 50 KHz.

Circuits (311a) and (313a) coupled to the signal pins (311) and (313) may be implemented using an FPGA/CPLD resident on the server blade (303) that generates or processes signals on these signal pins according to the personalized interface protocol. For example, a CPLD with a minimum of 512 macro-cells may be used. As shown in FIGS. 3A-3C, the circuits (311a) and (313a) coupled to the signal pins (311) and (313) are configured differently in the server blade (303) (e.g., by programming the FPGA/CPLD or other configurable/re-configurable devices) depending on the type of peripheral IO blade inserted into the mid-plane (302).

Although uni-directional and bi-directional driver symbols are used to represent the circuits (311a) and (313a) in FIGS. 3A-3C, those skilled in the art, with the benefit of this disclosure, will recognize that various other circuitries may be used as required by the interface protocol. Further, although PCIe, MDIO, I2C, and XAUI are used in the examples above for illustration, other interface protocols may also be used without deviating from the spirit of the invention. In the context of FIG. 1 and related description, the server blade (303) may be considered as the second device being inserted in the hot-plug process into the first device, which includes the mid-plane (302) and one of the peripheral IO blades (301a)-(301c) already inserted into the mid-plane (302), powered, and operational. In the same context, signal pin (312) may be considered as the first signal pin and circuit (312a) may be considered as the first circuit of the second device while signal pin (311) or (313) may be considered as the second signal pin and circuits (311a) or (313a) may be considered as the second circuit of the second device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A device comprising:
a connector having first and second signal pins adapted to, when the connector is being connected to a mating connector of another device, make a first connection using the first signal pin prior to making a second connection using the second signal pin;
a first circuit operatively coupled to the first signal pin and configured to identify at least three pre-determined signal patterns receivable from the another device using the first connection, wherein each of the at least three pre-determined signal patterns corresponds to one of at least three pre-determined interface protocols; and
a second circuit operatively coupled to the first circuit and the second signal pin, wherein the second circuit is configured, responsive to the first circuit identifying a pre-determined signal pattern of the at least three pre-determined signal patterns, to interface with the another device using at least the second signal pin, wherein to interface with the another device is according to a pre-determined interface protocol corresponding to the pre-determined signal pattern,
wherein configuring the second circuit responsive to the first circuit identifying the pre-determined signal pattern is prior to the second signal pin making the second connection.

2. The device of claim 1,
wherein the connector further comprises a power pin adapted to, when the connector is connected to the mating connector, make a power connection prior to the second signal pin making the second connection, and
wherein power is supplied to the second circuit using the power connection.

3. The device of claim 1,
wherein the at least three pre-determined signal patterns comprises a clock signal pattern, a static logic one signal pattern, and a static logic zero signal pattern.

4. The device of claim 1,
wherein the at least three pre-determined interface protocols comprises at least one selected from a group consisting of Peripheral Component Interconnect Express (PCIe) protocol, Management Data Input/Output (MDIO) protocol, XAUI protocol, and Inter-Integrated Circuit (I2C) protocol.

5. The device of claim 1,
wherein the connector further comprises a third signal pin,
wherein the first, second, and third signal pins transmit Hot-Plug Clock signal, Hot-Plug Status/Data signal, and Hot-Plug Data Direction signal, respectively, if the pre-determined interface protocol is PCIe protocol.

6. The device of claim 1,
wherein the connector further comprises a third signal pin,
wherein the second and third signal pins transmit MDIO Data signal and MD Clock signal, respectively, if the pre-determined interface protocol is MDIO protocol.

7. The device of claim 1,
wherein the connector further comprises a third signal pin,
wherein the second and third signal pins transmit I2C Data signal and I2C Clock signal, respectively, if the pre-determined interface protocol is I2C protocol.

8. A system comprising:
a first device having a first connector; and
a second device comprising:
a second connector having first and second signal pins adapted to, when the second connector is being connected to the first connector of the first device, make a first connection using the first signal pin prior to making a second connection using the second signal pin;
a first circuit operatively coupled to the first signal pin and configured to identify at least three pre-determined signal patterns receivable from the first device using the first connection, wherein each of the at least three pre-determined signal patterns corresponds to one of at least three pre-determined interface protocols; and
a second circuit operatively coupled to the first circuit and the second signal pin, wherein the second circuit is configured, responsive to the first circuit identifying a pre-determined signal pattern of the at least three pre-determined signal patterns, to interface with the first device using at least the second signal pin, wherein to interface with the second device is according to a pre-determined interface protocol corresponding to the pre-determined signal pattern, wherein configuring the second circuit responsive to the first circuit identifying the pre-determined signal pattern is prior to the second signal pin making the second connection.

9. The system of claim 8, wherein the second connector further comprises a power pin adapted to, when the second connector is connected to the first connector, make a power connection prior to the second signal pin making the second connection, and wherein power is supplied to the second circuit using the power connection.

10. The system of claim 8, wherein the at least three pre-determined signal patterns comprises a clock signal pattern, a static logic one signal pattern, and a static logic zero signal pattern.

11. The system of claim 8, wherein the at least three pre-determined interface protocols comprises at least one selected from a group consisting of Peripheral Component Interconnect Express (PCIe) protocol, Management Data Input/Output (MDIO) protocol, XAUI protocol, and Inter-Integrated Circuit (I2C) protocol.

12. The system of claim 8, wherein the second connector further comprises a third signal pin, wherein the first, second, and third signal pins transmit Hot-Plug Clock signal, Hot-Plug Status/Data signal, and Hot-Plug Data Direction signal, respectively, if the pre-determined interface protocol is PCIe protocol.

13. The system of claim 8, wherein the second connector further comprises a third signal pin, wherein the second and third signal pins transmit MDIO Data signal and MD Clock signal, respectively, if the pre-determined interface protocol is MDIO protocol.

14. The system of claim 8, wherein the second connector further comprises a third signal pin, wherein the second and third signal pins transmit I2C Data signal and I2C Clock signal, respectively, if the pre-determined interface protocol is I2C protocol.

15. A method for connecting a first device and a second device, comprising:

connecting a second connector of the second device to a first connector of the first device, wherein the second connector comprises first and second signal pins adapted to, when the second connector is being connected to the first connector, make a first connection using the first signal pin prior to making a second connection using the second signal pin;

receiving, by a first circuit of the second device using the first connection, a pre-determined signal pattern of at least three pre-determined signal patterns receivable from the first device, wherein each of the at least three pre-determined signal patterns corresponds to one of at least three pre-determined interface protocols;

identifying, by the first circuit, the pre-determined signal pattern of the at least three pre-determined signal patterns; and configuring a second circuit of the second device, responsive to the first circuit identifying the pre-determined signal pattern, to interface with the first device using at least the second signal pin, wherein to interface with the second device is according to a pre-determined interface protocol corresponding to the pre-determined signal pattern, wherein the configuring the second circuit responsive to the first circuit identifying the pre-determined signal pattern is prior to the second signal pin making the second connection.

16. The method of claim 15, wherein the second connector further comprises a power pin adapted to, when the second connector is connected to the first connector, make a power connection prior to the second signal pin making the second connection, and wherein power is supplied to the second circuit using the power connection.

17. The method of claim 15, wherein the at least three pre-determined signal patterns comprises a clock signal pattern, a static logic one signal pattern, and a static logic zero signal pattern.

18. The method of claim 15, wherein the at least three pre-determined interface protocols comprises at least one selected from a group consisting of Peripheral Component Interconnect Express (PCIe) protocol, Management Data Input/Output (MDIO) protocol, XAUI protocol, and Inter-Integrated Circuit (I2C) protocol.

19. The method of claim 15, wherein the second connector further comprises a third signal pin, wherein the first, second, and third signal pins transmit Hot-Plug Clock signal, Hot-Plug Status/Data signal, and Hot-Plug Data Direction signal, respectively, when the pre-determined interface protocol is PCIe protocol.

20. The method of claim 15, wherein the second connector further comprises a third signal pin, wherein the second and third signal pins transmit MDIO Data signal and MD Clock signal, respectively, when the pre-determined interface protocol is MDIO protocol.

21. The method of claim 15, wherein the second connector further comprises a third signal pin, wherein the second and third signal pins transmit I2C Data signal and I2C Clock signal, respectively, when the pre-determined interface protocol is I2C protocol.

* * * * *